(No Model.) 5 Sheets—Sheet 1.

W. G. JONES.
MACHINE FOR MANUFACTURING CLAY PIGEONS.

No. 519,127. Patented May 1, 1894.

Fig. 1.

Witnesses
B. McCormick Davis
Chas. A. Wiggy

Inventor
Wm. G. Jones
By
W. F. Chamblin & Co.
his Attorneys

THE NATIONAL LITHOGRAPHING COMPANY,
WASHINGTON, D. C.

(No Model.) 5 Sheets—Sheet 2.
W. G. JONES.
MACHINE FOR MANUFACTURING CLAY PIGEONS.

No. 519,127. Patented May 1, 1894.

(No Model.) 5 Sheets—Sheet 4.

W. G. JONES.
MACHINE FOR MANUFACTURING CLAY PIGEONS.

No. 519,127. Patented May 1, 1894.

Witnesses
Fig. 5.

Inventor
Fig. 6.
Wm. G. Jones
By M. F. Chamblin & Co.
his Attorneys

THE NATIONAL LITHOGRAPHING COMPANY,
WASHINGTON, D. C.

(No Model.) 5 Sheets—Sheet 5.

W. G. JONES.
MACHINE FOR MANUFACTURING CLAY PIGEONS.

No. 519,127. Patented May 1, 1894.

UNITED STATES PATENT OFFICE.

WILLIAM GRANT JONES, OF FINDLAY, OHIO.

MACHINE FOR MANUFACTURING CLAY PIGEONS.

SPECIFICATION forming part of Letters Patent No. 519,127, dated May 1, 1894.

Application filed July 24, 1893. Serial No. 481,355. (No model.)

*To all whom it may concern:*

Be it known that I, WILLIAM GRANT JONES, a citizen of the United States, residing at Findlay, in the county of Hancock and State of Ohio, have invented certain new and useful Improvements in Machines for the Manufacture of Clay Pigeons; and I do hereby declare the following to be a full, clear, and exact description of the invention, such as will enable others skilled in the art to which it appertains to make and use the same.

My invention relates to improvements in machines for the manufacture of clay pigeons or other forms of objects from plastic materials of any suitable mixture, and the objects of said invention are to produce a machine which is simple in construction, effective and automatic in its operation, and which shall be capable of producing one clay pigeon or other form, or a series of such forms at the same operation.

It consists essentially in a sectional belt composed of a series of links or blocks joined together, the said belt being properly arranged upon a suitable frame, and having a mold or series of molds located upon each block, means for heating the material to keep it in a liquid state, devices for supplying the proper amount of material to each mold, mechanism for forming the object and locking the belt during the formation of said object or objects, cooling devices for contracting the objects after being formed, mechanism for giving the belt a forward movement, ejecting devices for forcing the objects from the molds, fingers for receiving the objects when ejected, mechanism for operating the fingers, and a delivery apron upon which the objects are placed to be carried to a proper receptacle for receiving the objects.

My invention further consists in the novel construction and combination of the several parts as will be more fully hereinafter set forth and then pointed out in the claims.

Reference is had to the accompanying drawings and the figures of reference marked thereon, in which—

Fig. 9 illustrates the mechanism used for locking the belt during the process of forming the object.

Figure 4:
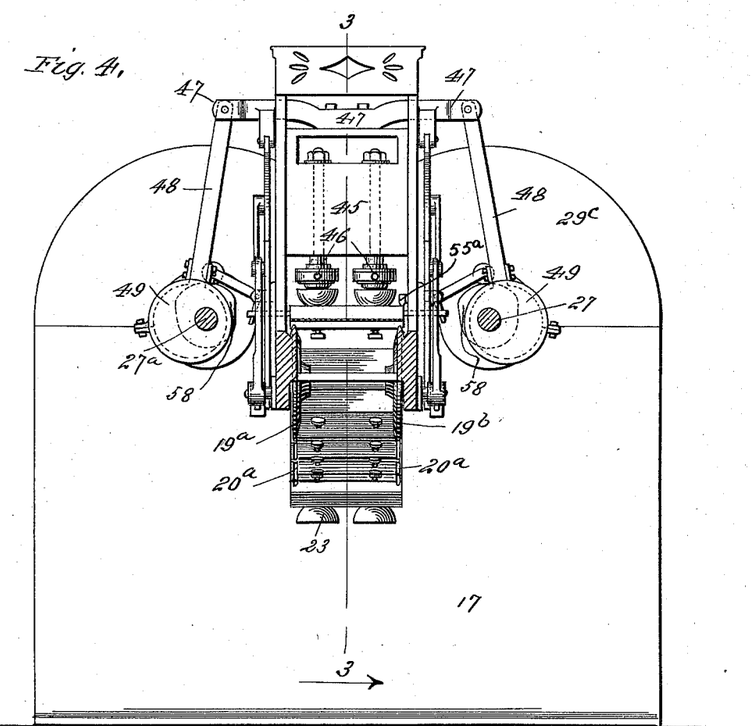
Fig. 4 is a transverse sectional view on the line 4—4 of Figs. 1 and 2.
Figure 7:
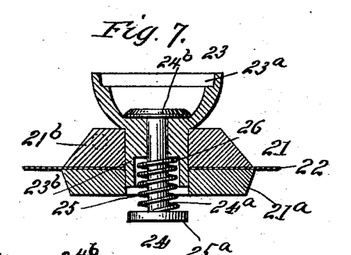
Fig. 7 is a transverse sectional view of one of the links or blocks, and through one of the molds located thereon illustrating the ejecting devices.
Figure 8:
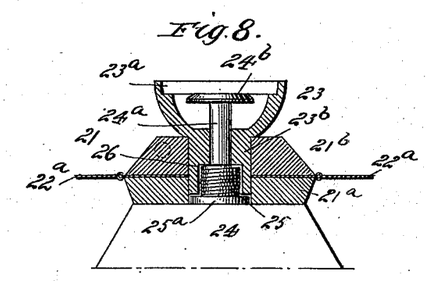
Fig. 8 is a similar view to Fig. 7 showing the ejector forced upwardly, and means for operating said ejector. Fig. $8^a$ is another form of mold that may be used.

In the drawings 15 is the frame provided with the standards 16 and 17 and having journaled under the frame and between the standards the hexagonal wheels 18 and 19. The forward wheel 18 is solid and extends the width of the belt 20, which is located thereon while the rear wheel 19 is composed of two parts $19^a$ and $19^b$ as shown in Fig. 4, and for the purpose as shall presently appear. The belt 20 which is arranged upon and carried by the wheels 18 and 19, is composed of blocks or links 21, joined preferably together by a sectional metallic chain $22^a$, as shown in Fig. 8, or by an endless flexible apron 22 as shown in the remaining drawings. The belt 20 at each side is provided with a groove $20^a$ into which the upper edge of the frame 15 is adapted to fit and which serves as a guide for said belt. The parts $19^a$ and $19^b$ of the rear wheel 19 have their faces so as to fit into the grooves $20^a$ of the belt, thus further serving to guide same, shown in Fig. 4. The blocks 21 are composed preferably of two parts $21^a$ and $21^b$, between which is clamped the apron 22. Each block has located upon it a mold 23, or series of molds, preferably of the form shown in Figs. 7 and 8, the said molds having a cup-shaped top $23^a$ and a stem $23^b$, which is secured within a recess or aperture of the block or link 21. Within the stem of the mold is the spring-pressed ejector 24 comprising the rod $24^a$ and its cap $24^b$, which cap serves as a bottom plate for the mold when in a position as shown in Fig. 7. The ejector 24 is further provided with a spring 25, which presses against the washer or disk $25^a$ secured to the rod $24^a$ and the upper surface of the recess 26 of the stem.

Figure 5:
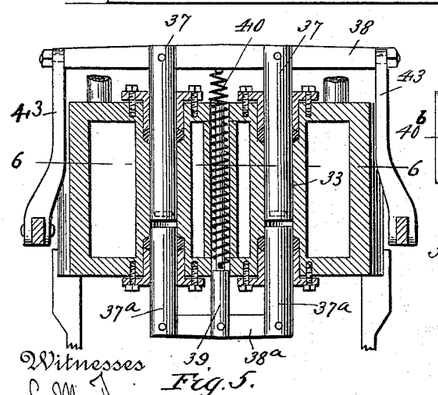
Fig. 5 is a sectional plan view of the valves and valve chests with part of the operating mechanism therefor, the said view being taken on the line 5—5 of Figs. 3 and 6.
Figure 6:
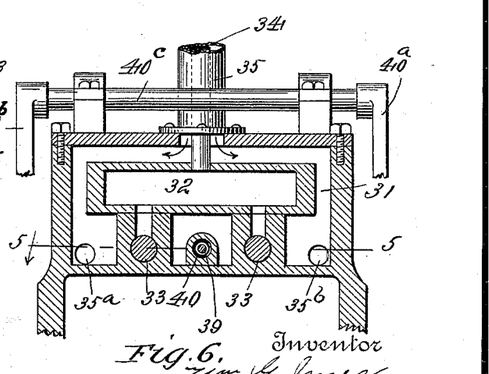
Fig. 6 is a vertical sectional view of the valves taken on the line 6—6 of Figs. 3 and 5.

The drive-shafts 27 and $27^a$ are located one on each side of the frame of the machine, one end of each shaft having its bearing in the standard 17, and the other end in brackets 28, which brackets are rigidly secured to the side and forward part of the machine. Upon the shaft 27 is a drive pulley 29 and a spur gear $29^a$ which meshes with the gear $29^b$ of the shaft $27^a$, by which means the two shafts are rotated in unison. The gears $29^a$ and $29^b$ are preferably centrally located upon the standard 17 and extend downwardly into same, the said standard being made hollow for that purpose, and provided with a hollow cap or cover $29^c$ which extends upward and entirely covers the gears. At 30 is the receiver for the material, the said receiver being rigidly secured to the frame of the machine and extending transversely across the same. The receiver comprises the steam chest 31, the material chamber 32, and the valve chests 33. The material is conveyed in a liquid form to the chamber 32 through the pipe 34, the said pipe passing through a steam pipe 35, which is much larger than the pipe 34 allowing sufficient space for the steam to circulate around the pipe and to enter the steam chest to keep the material in a liquid state. The steam passes from the steam chest through the outlets $35^a$ and $35^b$. Within the casing and at the lower portion thereof are the valve chests 33 best shown in Figs. 5 and 6. Each valve chest is provided with an inlet port 36 and an outlet port $36^a$, the former entering the material chamber 32, the latter located directly over the molds 23. Working within the valve chests are the valves or plungers 37 and $37^a$, each being provided with a stuffing box where it passes through the casing and the former of which is connected by the cross-bar 38, the latter by the cross-bar $38^a$, and both cross-bars being connected to each other by the rod 39 and the spring 40, the said spring being connected at one of its ends to the rod 39 and at its other end to the cross-bar 38. At $40^c$ is a rock-shaft journaled in bearings upon the receiver and provided at its ends with arms $40^a$ and $40^b$, which arms are secured to the shaft. The arm $40^a$ is provided near its end with a projection 41 which enters the cam-groove $41^a$, in cam-wheel 42, which is secured to the drive shaft 27, and by the said cam-wheel and its groove a rocking motion is given to the shaft $40^c$. At 43 are rods connecting the rocker arms $40^a$ and $40^b$ with the cross-bar 38. It will be seen that when the shaft is rotated movement will be imparted to the valves or plungers 37 through the medium of the cam-wheel, the rock-shaft and the connection therefrom to the valve or plunger cross-bar 38. The valves 37 serve to open the inlet port 36 and to push the material through the outlet port $36^a$, while the plungers $37^a$, which are yieldingly held to the plungers or valves 37 by a spring, serve to yieldingly guide the material through the outlet port, also to push any excess of material through said port when the plungers 37 are opening the ports for another charge.

Figure 1:
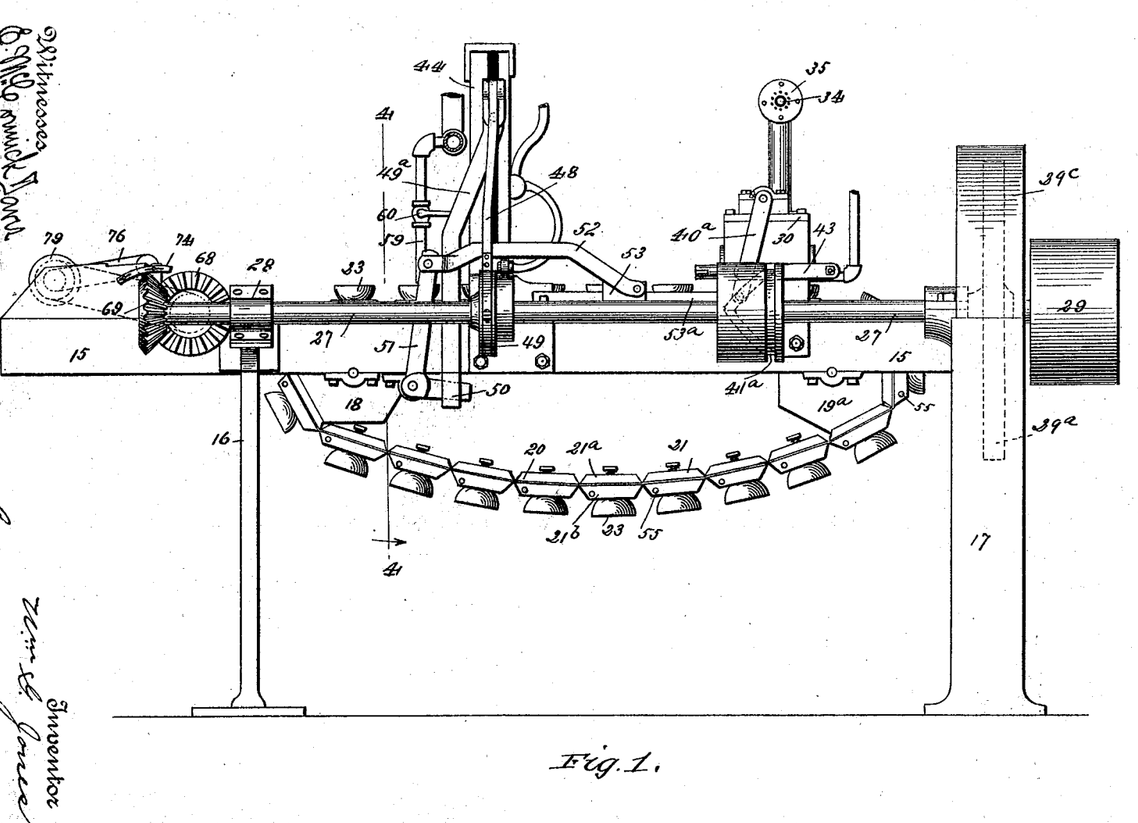
Figure 1 is a side elevation of the machine.
Figure 2:
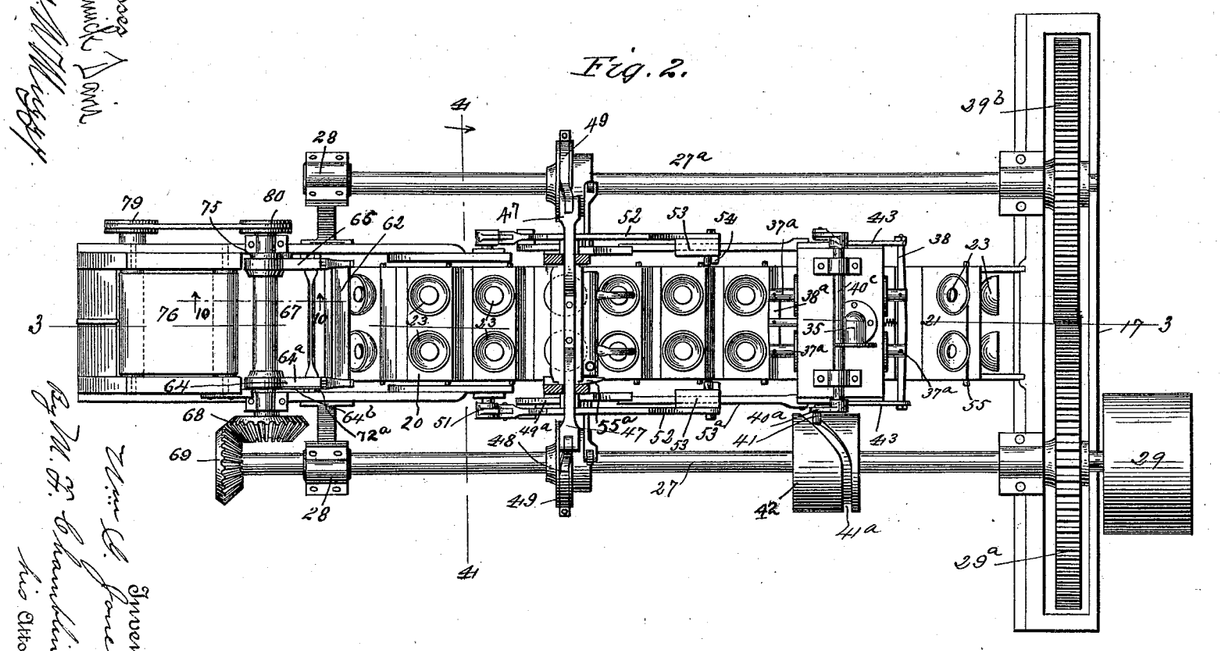
Fig. 2 is a plan view with the top above the plungers removed.
Figure 3:
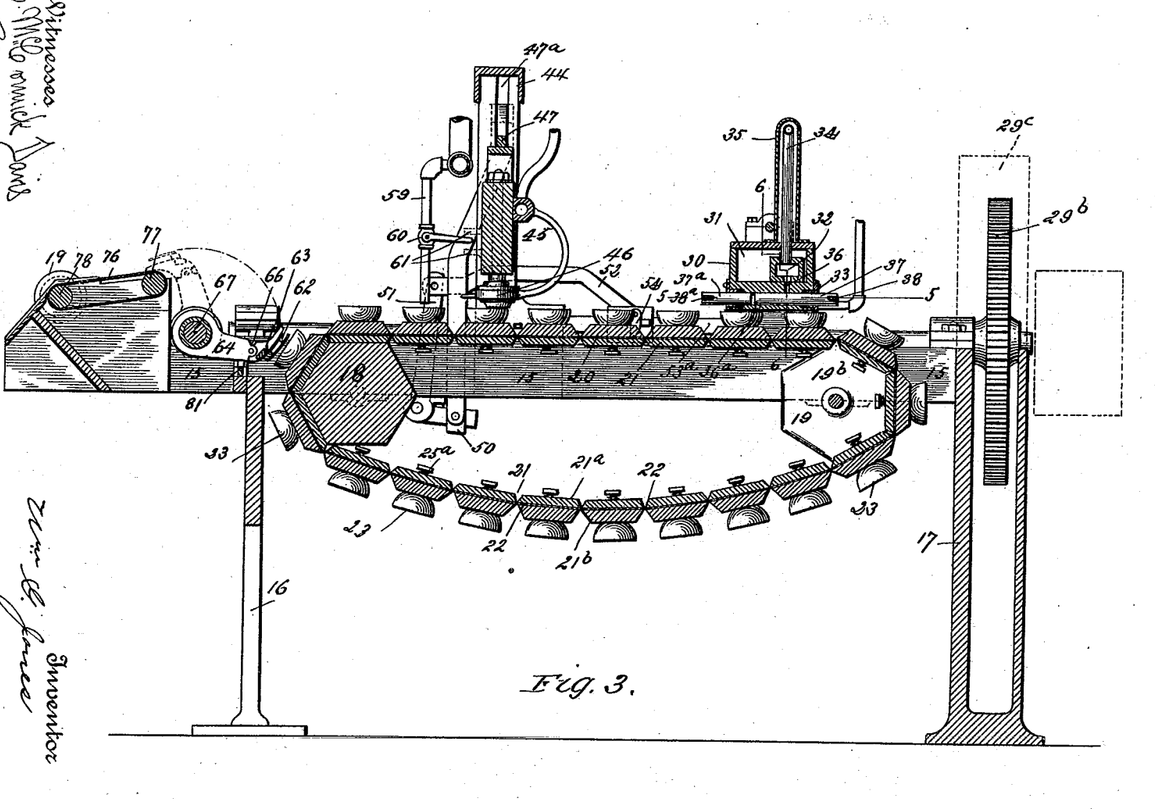
Fig. 3 is a longitudinal and vertical section on the line 3—3 of Figs. 2 and 4.
Figures 12, 13:
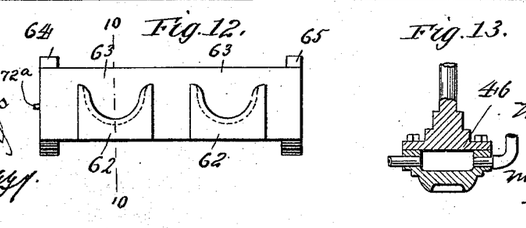
Fig. 12 is a view of the fingers with the pockets for receiving the objects and looking in the direction of the arrow 12 of Fig. 11.
Fig. 13 is a sectional view of one of the plungers.

The frame 15 has rigidly secured thereto the upright frame or cross-head guide 44 located at a short distance to the front of the receiver 30. At 45 is a cross-head carrying a plunger or series of plungers 46, corresponding to the number of molds upon each block of the belt, the said plungers being rigidly secured to the cross-head. These plungers 46 correspond in their exterior contour to the interior of the molds, but being less in diameter so that when the plungers are inserted in said molds a space remains between the plungers and the molds sufficient to give proper thickness to the article to be molded. The plungers 46, best shown in Fig. 13 are hollow and provided with connections for keeping the heads of the plungers heated, so that the material may be again heated, should it have cooled during its passage to the plungers. At 47 is a guide-bar secured to the cross-head and passing through the slots $47^a$ of the guides 44, the said slots also receiving the ends of the cross-head 45 to further guide the same in its upward and downward movement. To each end of the guide-bar 47 is connected the rod 48 of an eccentric 49, the said eccentrics being secured to the shafts 27 and $27^a$ respectively, and through which an upward and downward movement is imparted to the cross-head 45 and the plungers carried by said cross-head. At $49^a$ is a lever pivotally connected to the guide-bar 47 and extending downwardly on each side of the frame, the said lever carrying a slotted block 50 at the lower end thereof. At 51 are levers pivoted to each side of the frame, one end of each lever passing through the slot in the block 50 of the lever 49, the other end extending upwardly, and having pivotally connected thereto a longitudinally extending lever 52. This lever 52 is pivotally connected at its other end to a sliding block 53 which is slidingly held upon a slide-bar $53^a$ which passes through a slot in the sliding block 53, the said slide-bar having one of its ends secured to the frame of the cross-head guide, its other end to the casing of the receiver 30. These sliding blocks 53 and operating mechanism therefor, are located on each side of the machine and each block carries a pawl 54 shown in Fig. 3, which extends downwardly and is adapted to engage the laterally projecting pins 55, one on each side of every block 21, which comprise the belt 20. As the shaft revolves the eccentric gives movement to the cross-head and guide-bar 47 and through the medium of the levers 49, 51 and the lever 52 a sliding movement is given to the sliding-blocks 53, which by the pawl 54 carried by said blocks and engaging the pins 55 of the belt, impart a forward movement to the belt equal to the distance from the center of one mold to the center of the next one. At $55^a$ is a guide secured to or formed integral with the cross-head guide and serves to keep the belt down upon the edges of the frame 15.

Figures 8A, 9:
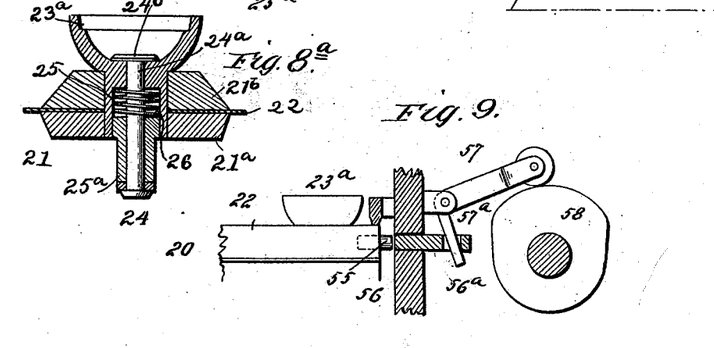
Figure 10:
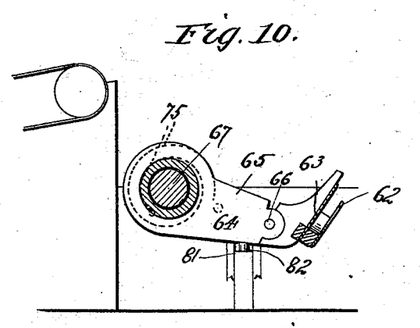
Fig. 10 is a sectional view of the fingers for placing the targets upon a traveling apron, the said view being taken on the line 10—10 of Figs. 2 and 12.
Figure 11:
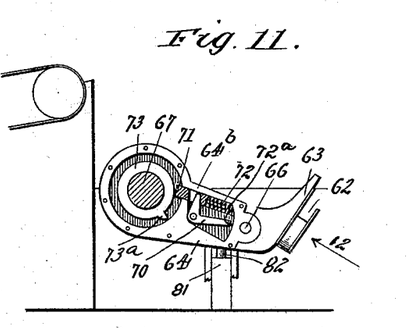
Fig. 11 is a sectional view to the front of the fingers, the said fingers being in elevation but having the front plate removed to illustrate the manner in which the fingers are operated.

The locking device to adjust the belt and secure it from movement during the formation of the object is best shown at 56 of Fig. 9. The locking-bar $56^a$ may be in frictional contact with the pins 55 of the belt or it may span both sides of the pins thus serving to adjust as well as to firmly lock the belt so that the molds will be in proper alignment with the plungers 46 of the cross-head 45. The locking-bar $56^a$ (located one on each side of the machine) has a slotted end which is engaged by the end $57^a$ of the lever 57 pivoted to the side of the frame and carrying at its other end a roller, the said roller being raised and lowered by a cam 58 secured to the drive shafts. The pipe 59 is for cooling and contracting the article after being formed in the mold, so that it may be more readily ejected therefrom. Each mold has a pipe leading thereto from a general supply pipe, through which a stream of water may be directed to each mold. At 60 is a valve provided with a handle for gaging the amount of water to flow on to the molds. If it is desired to work the valve automatically a couple of projections or pins 61, shown in dotted lines in Fig. 3 may be secured to the cross-head 45 and traveling with same will open and close the valve by coming in contact with the handle of the valve as the cross-head ascends or descends. In this case the valves are open when the belt 20 is stationary and closed when the belt is moved for the next mold to register with the plungers of the cross-head. In some instances it may be desirable to convey a blast of cold air for cooling and contracting the article instead of water, in which case the automatic opening of the valves will not be necessary. As the belt is moved forward, the disks of the ejectors rest upon the faces of the forward belt carrying wheel 18 and push the ejector upwardly thus ejecting the article formed in the molds, the position of the ejector at this time being best shown in Fig. 8. The articles are not ejected entirely from the mold, but in the movement of the belt and wheel 18 are caught by the pockets 62 located on the cross-bar 63 which connects the fingers 64 and 65. The pockets 62 best shown in Figs. 10, 11 and 12, are secured to the cross-bar 63 and have a concaved upper edge somewhat smaller than the largest diameter of the article to be caught thereby. The forward ends of the fingers are jointed at 66 so as to give a greater inclination of the pockets either when in a position as shown in Fig. 10, or as shown in dotted lines in Fig. 3. This admits of the article being more readily caught in the pockets and more readily ejected therefrom. The fingers are loosely held upon the shaft 67, which shaft is rotated by means of a miter gear 68 secured to the end thereof and meshing with a similar gear 69, secured to the drive-shaft 27. The fingers while in a position to receive the targets rest upon a cross-bar 81 which is secured to the standard 16, the said cross-bar having rubber projections 82, therefrom directly under each finger to reduce the shock of the fingers when returned to this position, as will presently appear. The finger 64 is composed preferably of two pieces $64^a$ and $64^b$, between which and in a recess of the latter is a bell-crank lever 70, shown in Fig. 11. This lever 70 has one of its ends engaging a slot in a locking pin 71, the said pin being spring-pressed by the spring 72, which forces it against the collar 73 secured to the shaft 67. The collar 73 has a projecting tooth $73^a$ which engages the locking pin 71 causing the fingers to move with the shaft. At $72^a$ is a lateral projection from the end of the bell-crank lever 70 which extends without the casing of the finger 64. This projection $72^a$ in its upward course engages the end of the adjustable bar 74 and throws the locking pin 71, out of engagement with the tooth $73^a$ of the collar 73 by means of the bell-crank lever 70, allowing the shaft to continue rotating without the fingers, the said fingers being suddenly returned to their normal position by a helical spring 75 secured to the sides of the fingers and to the frame. This action is very quick and the articles are deposited upon the apron 76 not unlike the action of drawing a knife quickly from beneath a silver dollar, the object being apparently undisturbed by such action. The apron 76 is slightly slanting and passes over two rollers 77 and 78, which are properly journaled upon the frame, one of which rollers being rotated by a belt passing over a pulley 79 secured to one end of the shaft of the apron roller and a pulley 80 secured to one end of the shaft 67, by which the apron is given movement.

In operation, to make clay pigeons or targets, the material preferably a mixture of clay and cement, which has been previously reduced to a liquid state by heat or otherwise, is conveyed to the material chamber 32 through the pipe 34 in which the said material is kept in a liquid state by a circulation of steam around said chamber. The machine now being started through the drive pulley 29 and the gears $29^a$ and $29^b$ the two shafts 27 and $27^a$ are rotated. The shaft 27 rotates the cam-wheel 42 by which and through mechanism movement is given to the valves or plungers 37 and $37^a$, which discharge the proper amount of material into the molds upon the belt. As soon as the molds are properly filled the belt locking mechanism is disengaged from the pins 55 of the blocks comprising the belt, and the said belt is then moved forward by means of the pawls 54 of the sliding blocks 53 and their actuating mechanism. During the forward movement of the belt the cross-head is ascending by means of the eccentric 49 and its connections thereto. The belt being moved forward until the next series of molds is in alignment with the plungers of the cross-head, the locking device 56 again secures the belt against movement, while the cross-head descends and forms the target by means of the plungers carried thereby. This being accomplished the cross-head ascends, the locking mechanism is released and the belt moved forward equal to the distance of one mold from the other. Cold water is now turned upon the targets either constantly or at intervals for cooling and contracting said targets, as previously described. These operations being repeated several times, the targets will then be in a position to be ejected from the molds which is done by the ejector being forced upwardly by one of the faces of the wheel 18. In this position the targets are caught by the pockets 62 carried by the fingers 64 and 65, and deposited by their actuating mechanism upon the traveling apron 76. The targets are then taken from the apron or slide into a receptacle placed in front of the machine. It will be noticed that in this machine the different movements are so arranged that two targets are completed and placed upon the traveling apron at each revolution of the shaft 27. The belt and molds thereon shown in Fig. 8, are similar in construction to those of Fig. 7 with the exception of the medium of connection between the sections of the belt, which in the former is a metallic sectional apron 22ª clamped between the parts 21ª and 21ᵇ. The form of mold illustrated in Fig. 8ª differs from both Figs. 7 and 8, mainly in making the head 25ª somewhat longer so that it may have a bearing within the recess 26 of the stem 23ᵇ of the mold.

In the drawings I have only shown two molds on each block, but it is obvious that I may increase this number if desired, or use only one if preferred. The form of the mold may be varied at will, also some of the parts may be modified without departing from the spirit of my invention. I have also shown in the drawings, the locking device 56 in contact with the projecting pins of the belt. If I wish I may provide recesses or apertures in the blocks, independent of said projecting pins, into which the end of the locking-bar 56ª would fit when the belt is secured from movement. This is an obvious construction and does not appear to need illustration.

Having thus fully described my invention, what I claim is—

1. The combination with a frame, of a cross-head vertically movable upon the frame, sliding blocks arranged upon the frame, bell-crank levers located upon the sides of the machine and having connections with the sliding blocks and the cross-head, whereby movement may be given to the sliding blocks as the cross-head ascends or descends, substantially as described.

2. The combination with a frame and a belt, carrying molds located upon said frame, of fingers carrying pockets thereon and located on the frame, means for raising and lowering said fingers, substantially as described.

3. The combination with a frame and a belt, carrying molds located upon said frame, of fingers mounted upon a shaft located upon the frame and having pockets thereon, the said fingers carrying a locking pin adapted to engage a portion of the shaft, and means for engaging and disengaging the locking pin, substantially as described.

4. The combination with a frame having a receiver comprising a material chamber and a steam chamber, located upon the frame, the said material chamber being located within the steam-chest of the receiver, of a belt composed of sections, with a mold or series of molds arranged upon each section, the said belt having projections adapted to be engaged by pawls carried by sliding blocks located on opposite sides of the machine, and means for giving movement to the sliding block, substantially as described.

5. The combination with a frame provided with wheels journaled on said frame and having a belt with molds carried by the wheels of ejectors located within the molds and adapted to be forced upwardly by one of the wheels, fingers carrying pockets arranged in front of the wheel, substantially as described.

6. The combination with a frame and a belt, carrying molds arranged upon said frame, the said belt having ejectors located within each mold, of cooling devices arranged above the molds for contracting the articles when molded, fingers carrying pockets arranged to receive the articles when ejected from the molds, substantially as described.

7. The combination with a frame and a belt, carrying molds provided with ejectors located thereon, of fingers adapted to receive the molded articles when ejected, a locking bar located on the frame and engaging the belt, and means for releasing the locking bar, substantially as described.

8. The combination with a frame, of a traveling apron carried by rollers journaled on said frame, a belt composed of sections having a mold or series of molds carried by each section, and fingers arranged between the belt and the apron and adapted to receive the molded articles from the molds and to place them upon the traveling apron, substantially as described.

9. The combination with a frame and a belt, carrying molds located upon said frame, the said belt composed of blocks or sections and having projections therefrom, of a sliding-block located on a slide-bar secured to the frame and carrying a pawl adapted to engage the projections on the blocks or sections of the belt, a cross-head working in guides located on the machine, levers connecting the cross-head to the sliding-blocks, a locking-bar engaging the projections during the backward movement of the sliding-block for holding the belt stationary, and means for actuating the locking bar, substantially as described.

10. The combination with a frame, of a receiver comprising a steam-chest, a material chamber, and valve-chests located within the steam-chest, valves located within the valve-chests and having connections with the material chamber, a rock-shaft arranged upon the receiver and connected to the valves and means for operating the rock-shaft, substantially as described.

11. The combination with a frame, and an endless belt carrying molds located upon said frame, of guides secured to the frame and having a slot extending lengthwise thereof, a cross-head working in guides and carrying plungers, the said cross-head carrying a guide-bar which passes through the slots of the guides and having secured to the ends thereof eccentric rods actuated by eccentrics secured to the drive shafts, a sliding-block located on the frame and moved by the cross-head for giving movement to the belt, substantially as described.

12. The combination with a frame provided with wheels journaled on said frame and having a belt with molds carried by the wheels, of a sliding block located on the frame and carrying a pawl engaging projections on the belt and means for actuating the sliding block, substantially as described.

13. The combination with a frame and guides located upon the frame, of a cross-head working in the guides, and carrying a guide-bar, depending levers connected to the guide-bar and actuating bell-crank levers pivoted to the frame of the machine, levers connecting the sliding-blocks to the bell-crank levers, and means for actuating the cross-head, substantially as described.

14. The combination with a frame and an endless belt carrying molds located upon said frame, the said belt composed of blocks or sections and having projections therefrom, of a sliding-block located on a slide-bar secured to the frame and carrying a pawl adapted to engage the projections on the blocks or sections of the belt, a cross-head working in guides located on the machine, levers connecting the cross-head to the sliding-blocks, and means for actuating the cross-head, substantially as described.

15. The combination with a frame and a belt carrying molds located upon said frame, pipes for cooling purposes located above the molds and each provided with a valve, a cross-head working in guides secured to the frame, means for actuating the cross-head, devices carried by the cross-head for automatically opening and closing the valves of said pipes, substantially as described.

16. The combination with a frame and a belt carrying molds located upon said frame, of a locking-bar engaging a portion of the belt, a bell-crank lever pivoted to the frame and engaging the locking bar at one of its ends, a cam secured to the drive shaft for actuating the bell-crank lever, substantially as described.

17. The combination with a frame and a belt carrying molds located upon said frame, of a sliding-bar held upon the frame and engaging projections on the belt, a bell-crank lever pivoted to the side of the frame and engaging the sliding-bar with one of its ends, and carrying a roller on the other end, a cam secured to the drive shaft and adapted to raise the bell-crank lever, substantially as described.

18. In a machine of the character described, the combination with a frame, of fingers carrying pockets thereon and located on said frame, means for raising and lowering said fingers, substantially as described.

19. The combination with a shaft and means for rotating the shaft, of a locking pin carried by the fingers and adapted to engage a portion of the shaft, means for engaging and disengaging the locking-pin with or from the shaft, substantially as described.

20. The combination with a shaft and means for rotating the shaft, of a locking-pin carried by the fingers and normally pressed against the shaft, a tooth or projection carried by the shaft and adapted to engage the locking-pin, a lever engaging the locking pin, and means for throwing the locking pin out of engagement with the tooth of the shaft, substantially as described.

21. The combination with a shaft and means for rotating the shaft, of a locking pin carried by the fingers and normally pressed against the shaft by a spring, a tooth or projection carried by the shaft, and adapted to engage the locking pin, a bell-crank lever at one of its ends engaging the locking pin and at its other end a projection adapted to engage a bar located on the machine for releasing the locking pin, means for returning the fingers to their normal position, substantially as described.

22. The combination with a frame, of a traveling apron carried by rollers journaled on said frame, a shaft located in front of the apron, and means for revolving the shaft, the said shaft carrying fingers for depositing objects upon the apron, means for connecting the shaft to one of the rollers of the traveling apron for giving movement to said apron, substantially as described.

23. The combination with a frame, of a belt comprising a series of sections or blocks, each block composed of two pieces and clamping a flexible apron between the pieces for securing the blocks together, a mold or series of molds provided with a stem which is arranged within a recess in each section or block, a spring-pressed ejector located within and carried by each mold, and means for actuating said ejector, substantially as described.

24. The combination with a receiver, having a material chamber and valve-chests provided with inlet and outlet ports one of which connects with said chamber, of valves located within the valve-chests and having supplemental valves or plungers located in said chests and yieldingly connected to the former, and means for actuating the valves, substantially as described.

25. The combination with a receiver having a material chamber and valve-chests provided with inlet and outlet ports one of which connects with said chamber, of valves located within the valve-chests and having supplemental valves or plungers located in said chests, the said supplemental valves yieldingly held to the main valves, a rock-shaft located on the receiver and engaging the groove of a cam-wheel secured to the drive-shaft, a lever connecting the rock-shaft to the valves, substantially as described.

In testimony whereof I affix my signature in presence of two witnesses.

WM. GRANT JONES.

Witnesses:
H. WALTER DOTY,
I. S. SUNDAY.